Aug. 3, 1948.    G. R. BRICKER    2,446,168
ANIMAL TRAP

Filed May 30, 1944    5 Sheets-Sheet 2

INVENTOR.
Gary R. Bricker
BY
ATTORNEY

Aug. 3, 1948.     G. R. BRICKER     2,446,168
ANIMAL TRAP
Filed May 30, 1944     5 Sheets-Sheet 3

INVENTOR.
Gary R. Bricker
BY
ATTORNEY

Aug. 3, 1948.　　　G. R. BRICKER　　　2,446,168
ANIMAL TRAP

Filed May 30, 1944　　　　　　　　　5 Sheets-Sheet 5

INVENTOR.
Gary R. Bricker
BY
ATTORNEY

Patented Aug. 3, 1948

2,446,168

UNITED STATES PATENT OFFICE 2,446,168

ANIMAL TRAP

Gary R. Bricker, United States Army, Omaha, Nebr.

Application May 30, 1944, Serial No. 538,082

8 Claims. (Cl. 43—76)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to traps, and more particularly to devices for trapping rodents and other animals and for isolating certain of the animals.

An object of this invention is to provide an animal trap having a housing which is divided into a first compartment and a second compartment, means for entrapping an animal in the first compartment, means for luring the animal from the first compartment into the second compartment, and means for entrapping the animal in the second compartment and resetting the trapping means of the first compartment.

Another object of this invention is to provide an animal trap composed of a first housing and a separate second housing, means for entrapping animals in the first housing, the second housing communicating with the first housing, and the second housing being detachably secured to the first, whereby the second housing may be conveyed to a remote location while the first housing remains in its original location to entrap additional animals.

A further object of this invention is to provide an animal trap composed of two separate housings which are detachably secured together to provide a unit, the first housing having entrapping means, and the second housing being communicable with the first and including means for segregating selected animals therein.

A specific object of this invention is to provide an animal trap composed of two separate housings, the first housing having two compartments, the first compartment having an inlet opening and a closure therefor, means actuated by the weight of an animal for closing the closure to entrap an animal in the first compartment, means for communicating the second compartment with the first compartment, after an animal has been trapped in the first compartment, to admit the animal into the second compartment, the second housing being arranged for communication with the second compartment of the first housing, and manually controlled means for controlling communication therebetween.

A more specific object of this invention is to provide an animal trap which includes two separate and complete housings which may be secured together to provide a single unit, the first housing including a first compartment and a second compartment, means for entrapping animals in each compartment, means for permitting communication between the compartments when an animal has been entrapped in the first compartment, the second housing having separate compartments, and manually operated means for affording communication between the last-named compartments, and means for communicating the second compartment of the first housing with the second housing.

It is also an object of this invention to provide an animal trap of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts and in the details of construction herein described and claimed, it being understood that various changes in form, proportion and minor details of construction may be made within the scope of the claims without departing from the spirit or sacrificing any advantages of the invention.

For a complete disclosure of the invention, a detail description thereof will now be given in connection with the drawings forming a part of the specification wherein.

Referring to the drawings, in which corresponding parts are indicated by similar reference characters, there is depicted a trap which includes separate elongated housings 10 and 11. The housing 10 includes a bottom 12, side walls 13 and 14, top 15 and end walls 16 and 17, and the housing 11 includes a bottom 18, side walls 19 and 20, top 21 and end walls 22 and 23. The housings may be formed of any suitable material, but wire mesh or other reticulated or perforated material is preferable, inasmuch as structures formed of such materials permit visual observation of the animals in the trap.

The first housing 10 has an entrance opening 25 formed in the end wall 17 thereof, and this opening is provided with a gravity-actuated closure or door 26, which is mounted for vertical sliding movement in guideways or flanges 27 carried by the end wall 17. The lower terminal of the closure 26 is provided with an inwardly extending projection 28, which engages the upper terminal of the entrance opening 25 to form a stop.

The downward movement of the entrance closure 26 is limited by a first composite lever 29, as will be explained hereinafter. The composite lever includes spaced lever arms 30, which are united at their forward terminals by a manipulating handle or member 31 which is located under the closure 26. The spaced arms 30 are supported for pivotal movement by a transversely-extending horizontal pivot or fulcrum rod 32 upon which the arms are journaled by suitable means such as the tubular bearings 32'. Portions 30a of the arms 30 extend rearwardly beyond fulcrum rod 32 and they are tangentially disposed relative to the bearings 32' and have a platform 33 secured thereto, for a purpose to be hereafter disclosed.

The housing 10 has a transversely-extending partition 35 secured therein intermediate its terminals to divide the housing into a first compartment 36 and a second compartment 37. This partition has an opening 38 formed therein to permit communication between the first and second compartments. A gate 40, formed of reticulated, perforated or transparent material, is suspended within the partition opening 38 for pivotal movement from a horizontally-extending shaft 41. The gate 40 is limited against movement towards the first compartment by its lower terminal engaging the runway 38' formed in the opening 38 of the partition 35, and the movement of the gate rearwardly, or towards the second compartment 37, is limited by it engaging a transversely-extending stop bar 42 which is located in the path of movement of the gate 40. By this arrangement, the gate may be moved a limited distance to permit an animal to move from the first compartment into the second compartment, but the animal is trapped against movement back into the first compartment from the second compartment.

A platform 45 is supported for pivotal movement by a transverse bar or shaft 46 extending through the sides of the housing 10 at a point adjacent their bottom edges and journaled in a tubular bearing 46' secured to the underside of the platform. This platform 45 is located within the first compartment 36 between its entrance and its outlet, so that an animal which enters the compartment and moves towards the outlet will cause the platform to swing or gravitate about its fulcrum shaft 46. The weight of the platform 45 is so distributed that its center of mass is located at the entrance side of the fulcrum shaft so that its forward terminal normally gravitates to engagement with the floor of the first compartment. Arms 47 extend upwardly from the forward terminal of the platform, and these arms have trip fingers 48 extending forwardly therefrom, and these fingers are normally disposed in the path of movement of the entrance closure 26, for a purpose to be hereinafter set forth.

Figure 6:
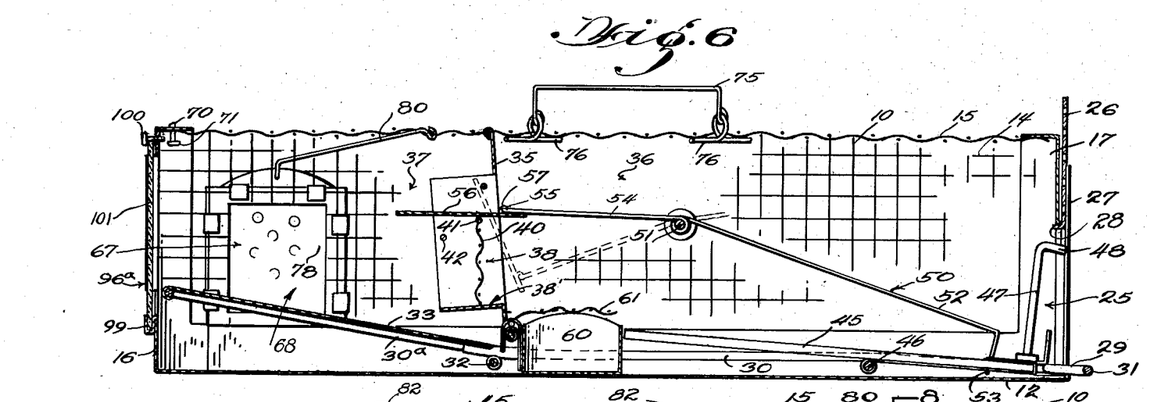
Figure 6 is a vertical longitudinal sectional view taken through the first housing on the line 6—6 of Figure 2.
Figures 10, 11:
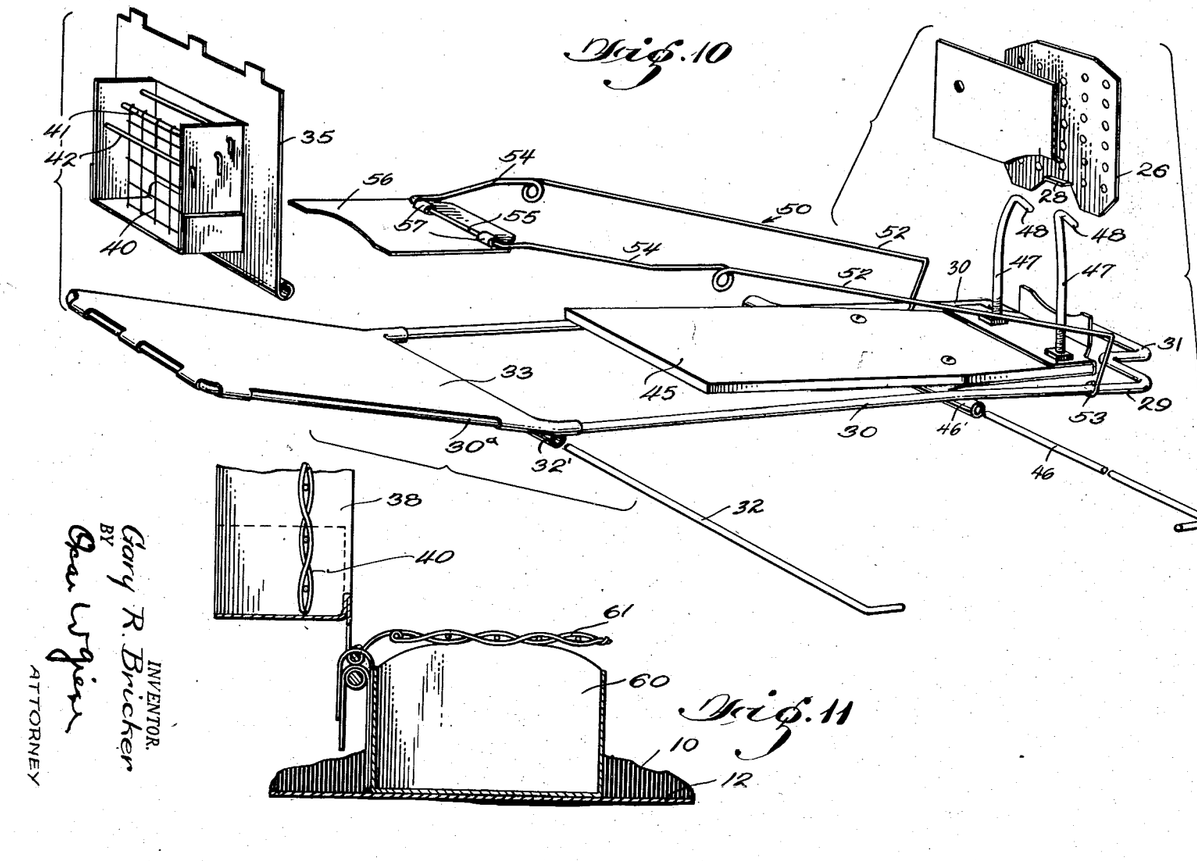
Figure 10 is a composite perspective view in brackets depicting the trapping components of the first housing.
Figure 11 is a fragmentary vertical sectional view taken through the bait box and partition frame.

A second composite lever 50 is provided, and this lever is pivoted or fulcrumed on bolts or studs 51, which are secured to the side walls 13 and 14 of the housing 10. This lever includes spaced parallel arms 52 which extend forwardly from the fulcrum studs 51, and have their forward terminals slidably secured to the arms 30 of the first lever 29 by suitable eyes 53. This lever also has spaced parallel arms 54 which extend rearwardly from the pivot studs. These arms are united by a transversely-extending bar 55 which is pivotally secured to a rockable and slidable closure 56 by means of eyes or loops 57, as best seen in Figure 10. The closure 56 is supported by the transversely-extending bar 55 of the second lever, and it is also guided and supported for sliding and pivotal movement by the gate shaft 41. When the first lever 29 is moved about its pivot or fulcrum rod 32, the second lever 50 is also rocked about its fulcrum studs 51, and this rocking movement of the lever 50 causes its transversely-extending bar 55 to move in an arc concentrically about the studs 51. As the bar 55 moves upwardly, it approaches the gate shaft 41, and when it reaches the upper limit of its movement, the closure 56 is disposed in horizontal position as best seen in Figure 6. In this position, the opening 38 between the first and second compartments 36 and 37 is open so that an animal may pass from the first compartment into the second compartment merely by moving the gate about its suspending shaft to open position.

A removable bait box 60 is located within the first compartment 36 between the rear terminal of platform 45 and the partition 35, and this box has a cover 61 pivotally secured thereto. The cover is preferably formed of wire mesh or other reticulated or perforated material to thus expose the bait, but to hold it in the box. Any suitable bait may be employed, such as meat, cheese, or other food. A door 62 is pivotally secured at its lower terminal to the outer side wall 13 of the first compartment immediately adjacent the bait box 60, so that access may be gained to the bait box by simply opening the door 62. This door 62 is preferably held in its closed position by a locking bar 63 which has an eye 65 at one terminal to pivotally secure it to the housing wall 13, and its opposed terminal provided with a hook or latch 66 to engage in the meshes of the wall 13 to thus lock the door in its closed position. By simply moving the hook or latch 66 from engagement with the wall 13, and then swinging the locking bar 63 about its pivot 65, the door 62 may be readily opened to gain access to the bait box 60.

Figures 7, 8, 9:
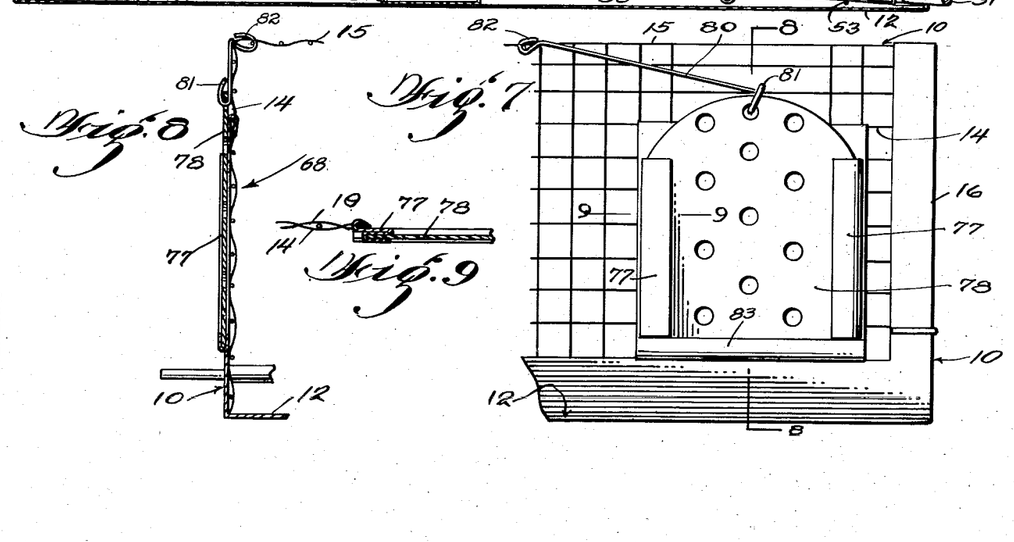
Figure 7 is a fragmentary elevation depicting the exterior of the door which controls communication between the first and second housings.
Figure 8 is a fragmentary vertical sectional view taken on the line 8—8 of Figure 7.
Figure 9 is a fragmentary horizontal sectional view taken on the line 9—9 of Figure 7.

The housing 11 communicates with the compartment 37 of housing 10 through an outlet opening 67 formed in the side wall 14 of the housing 10, and this outlet opening is aligned with an inlet opening 85 formed in the side wall 19 of the housing 11. The housings 10 and 11 are normally secured together by links or tie-bars 70, and each tie-bar has one terminal pivotally secured to the housing 10, indicated as 71, and the opposed terminal is provided with an extension or hook 72 that engages in an aperture 73. A link or tie-bar 70a is also pivotally secured at one terminal to the end wall of one housing and its opposed terminal is hooked into an end wall of the other housing near its bottom to tie the bottom portions of the housings 10 and 11 together. By this arrangement, the housing 11 may be secured to the housing 10, so that they provide, in effect, a unit. Each housing is provided with a handle or bail 75 which is pivotally secured thereto, as indicated as 76, and these handles are placed side by side so that both handles may be grasped in the hand in order to convey the housings 10 and 11 as a unit to any required destination. Slideways or guides 77 are carried by the housing 10 at each side of the outlet opening 67 for the sliding reception of a door or closure 78 as shown in Figs. 7 and 9. The upper terminal of the door 78 has a link 80 pivotally secured thereto, as indicated at 81, and the opposed terminal of the link is secured to the top 15 of housing 10 by an eye 82. A flanged strip or sill 83 extends across the bottom of the outlet opening 67, and this sill receives and supports the door 78 when it is in closed position.

Figure 1:
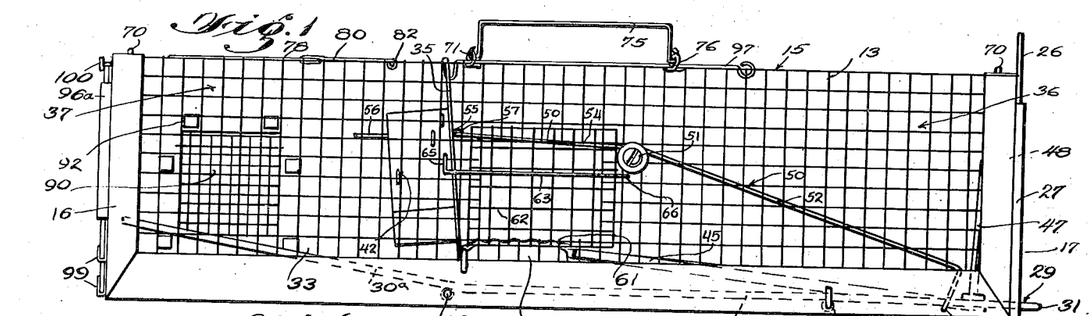
Figure 1 is a side elevation of the improved animal trap.
Figure 2:
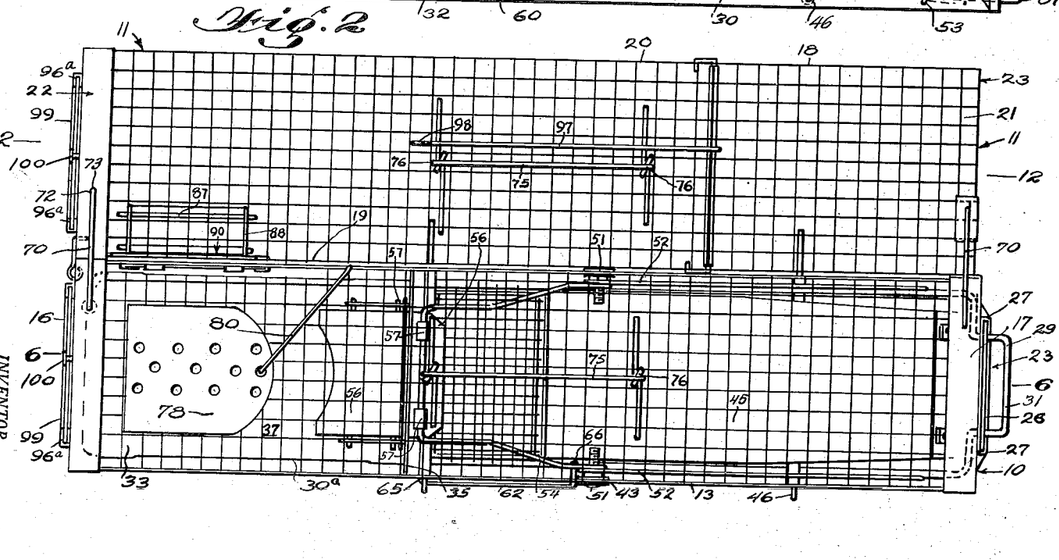
Figure 2 is a plan view of the trap.
Figure 3:
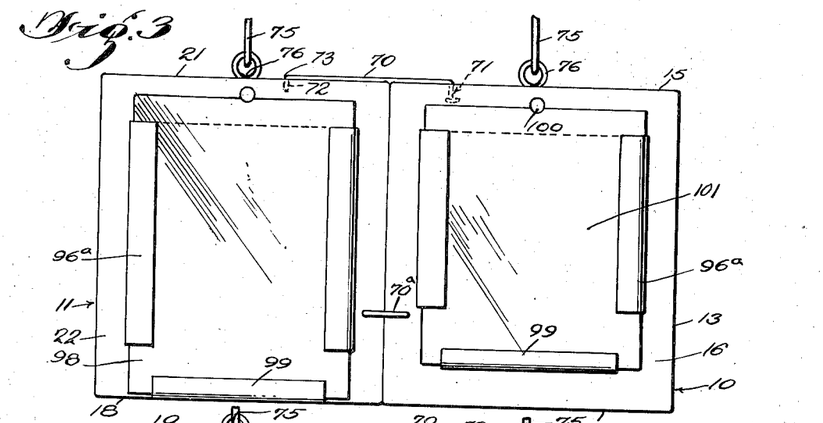
Figure 3 is an end elevation of the outlet end of the trap.
Figure 4:
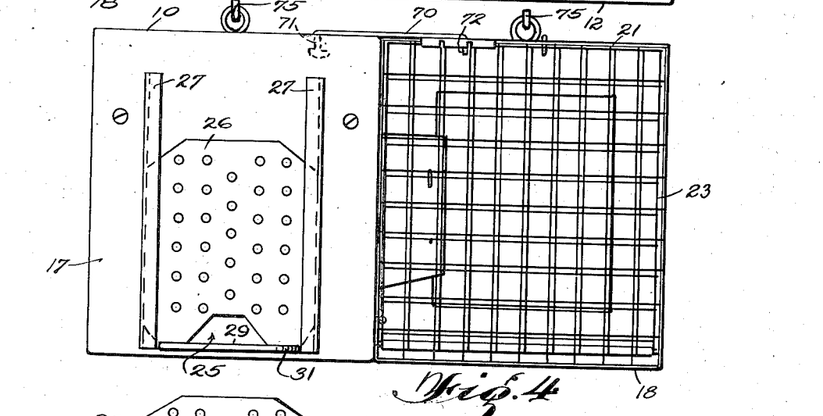
Figure 4 is an end elevation of the inlet end of the trap, showing the trap closure in closed position.
Figure 5:
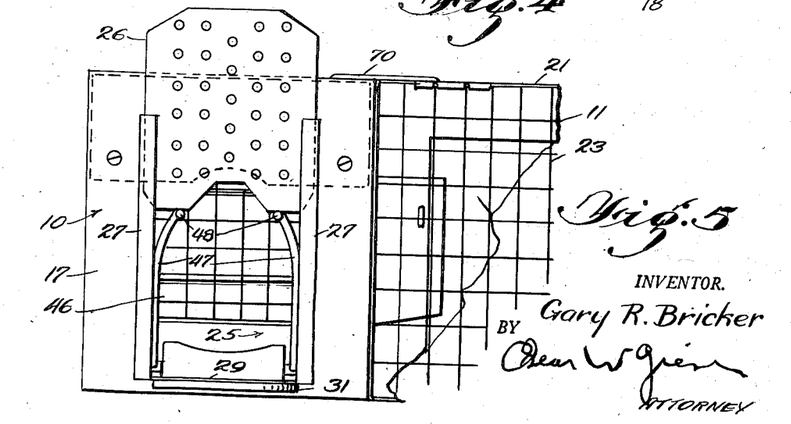
Figure 5 is a similar view depicting the closure in open position.

By this arrangement, the door 78 may be readily opened by pulling upwardly on the link 80, and when this door is open the animals which are entrapped in compartment 37 of housing 10 may pass through the outlet opening 67 of housing 10 and through an entrance opening 85 formed in the side wall 19 of the housing 11 and into this housing. When the passageway between housings 10 and 11 is to remain open the door 78 may be allowed to rest on the top of one of the housings as shown in Fig. 2.

The entrance opening 85 of the housing 11 is surrounded by a frame 86, and a stop bar or rod 87 is supported by side flanges 88 of the frame 86, and this rod limits the inward or opening movement of a gate 90 which is suspended for pivotal movement within the inlet opening 85 from a hinge shaft 91. As an animal passes from the compartment 37 of the housing 10 into housing 11, it forces the swinging gate 90 inwardly until it engages the stop bar 87 and, in this position, an animal may enter the housing 11. After the animal disengages the swinging gate 90, the gate swings back to its normal position and the outward movement of this gate is limited by engaging a sill flange 92 carried by the entrance-opening frame 86.

Figure 12:
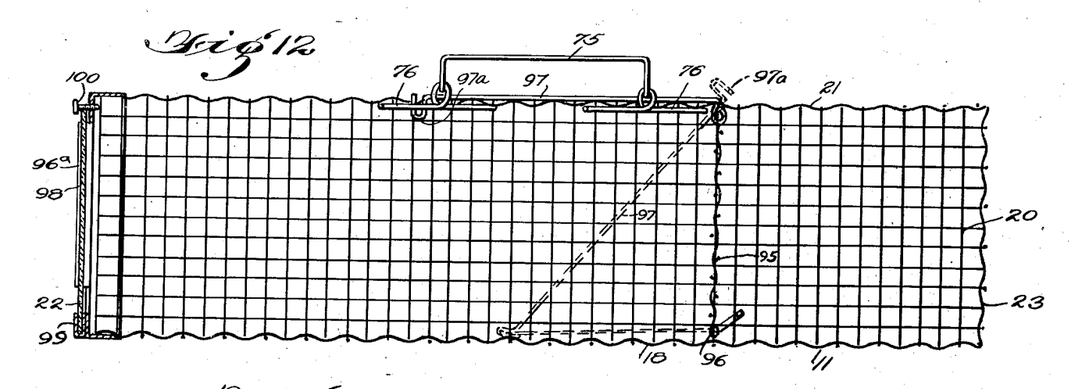
Figure 12 is a vertical longitudinal sectional view taken through the second housing on the line 12—12 of Figure 2.
Figure 13:
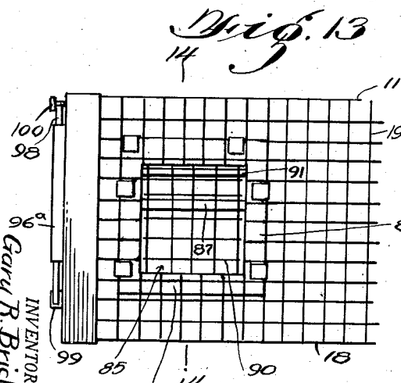
Figure 13 is a fragmentary elevational view of the second housing depicting this inlet gate.
Figure 14:
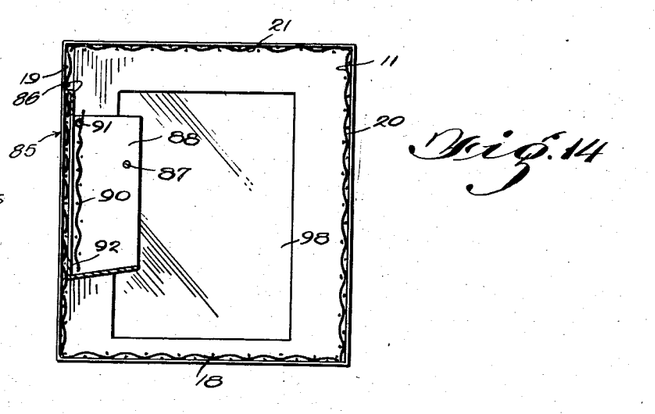
Figure 14 is a vertical transverse sectional view taken through the second housing on the line 14—14 of Figure 13.

Housing 11 is provided with a partition 95 which is hinged at its lower terminal on a transversely-extending shaft 96 which is secured to the side walls 19 and 20 of the housing 11. The upper terminal of the partition 95 has a manipulating arm 97 pivotally secured thereto, and this arm has a hook 97a provided as its outer terminal, and this hook engages the top wall 21 of the housing 11 to normally secure the hinged partition 95 in vertical position, thereby causing the partition 95 to divide the housing 11 into separate compartments, which provide the third and fourth compartments of the trap as shown in full lines in Fig. 12.

A vertical guideway 96a is provided at each side of the end wall 16 of housing 10, and also at each side of the end wall 22 of housing 11 for the sliding reception of transparent panels 101 and 98. The bottom of each panel is received in a flanged sill 99 which supports the weight of the panel. Thumb screws or bolts 100 are screwed into threaded apertures formed in the end wall 16 and 22, and each screw 100 is located above each panel in the path of the upward movement of the panel to normally lock the panel against vertical movement in its guideways. The panel 101 forms a transparent closure for compartment 37 of housing 10, and the panel 98 forms a transparent closure for the third compartment of the trap. Inasmuch as the panels 101 and 98 are transparent, they lure trapped animals which are seeking to escape to move towards the panels.

In operation, the manipulating handle 31 of the first lever 29 extends forwardly beyond the front of the housing 10, so that it may be grasped by an operator and elevated to swing the lever upwardly about its fulcrum shaft 32. Inasmuch as the manipulating handle 31 of the lever 29 engages the lower terminal of the entrance closure 26, this closure is moved upwardly as the manipulating handle moves upwardly. When the closure 26 approaches the limit of its upward movement, the fingers 48, which are supported from the platform 45, are disengaged from the closure 26, thereby permitting the forward portion of the first platform 45 to gravitate about its fulcrum for engagement with the bottom 12 of the housing, thus locating the fingers 48 in the path of downward travel of the closure 26, to thus hold the closure 26 in its elevated position. When the manipulating handle 31 of the first lever 29 is released, after elevating the entrance closure 26, the arms 30 and handle 31 of this first lever move downwardly until their movement is limited by the manipulating handle 31 engaging the bottom 12 of the housing 10. As the handle 31 and arms 30 move downwardly, the rearwardly extending arms 30a move upwardly, thereby rocking the composite lever 50 about fulcrum studs 51, which causes arms 54 to exert a pull on the partition closure 56 to slide it upwardly over the gate shaft 41. As the closure 56 moves upwardly, it swings around the gate shaft 41 and assumes a horizontal position when the limit of its upward movement has been reached. This position of the closure 56 leaves the partition 35 open to permit communication between the compartments 36 and 37 of housing 10.

Assuming that the bait box 60 has been filled with a suitable bait, the trap is now set in trapping condition. A rat or other animal is induced to enter the first compartment 36 through the entrance opening 25 by the presence of the bait at the rear of this compartment. After the animal enters the compartment 36, it moves rearwardly along the first platform 45, but when it moves beyond the supporting shaft 46, the weight of the animal causes the platform to gravitate about this fulcrum shaft so that it forward terminal moves upwardly and its rear terminal engages the bottom 12 of the housing 10. This causes the fingers 48 to move from engagement with the bottom of the entrance closure 26, thereby permitting this closure to gravitate to closed position, thus entrapping the animal in the first compartment 36. The entrapped animal, seeking to escape, will be lured into the second compartment 37 by the apparently open outer end of the second compartment beyond screen door 40, inasmuch as transparent panel 101 is in alignment with the opening 38 of partition 35. When the animal enters compartment 37 through the partition opening 38, it steps on the second platform 33 and moves rearwardly in this compartment towards the transparent lure panel 101. The animal's weight causes the second platform 33 to gravitate about its fulcrum shaft 32, thereby raising the forward arms 30 and their manipulating handle 31. The manipulating handle 31, in turn, raises the entrance closure 26. As the forward arms 30 of the first lever 29 move upwardly, they swing the second lever 50 about its fulcrum studs 51 and close the partition closure 56 by sliding it downwardly over horizontal gate shaft 41 to a nearly vertical position athwart the partition opening 38, thus entrapping the animal in the second compartment 37. If it is desired to transfer the animal from the second into the third compartment within the housing 11, the outlet closure 70 of the second compartment is raised, thus permitting the animal to move into the third compartment. As partition closure 56 separates the animal in the second compartment from the bait box 60 in the first compartment, the animal will be anxious to leave the second compartment for the third compartment, thus releasing the pressure on the second platform 33, which in turn resets the trap for another animal.

These operations are repeated until a sufficient number of animals have been entrapped in the third compartment, and if it is desired to segregate one or more of the animals, the pivoted partition 95 is moved downwardly towards the third compartment by manipulating the arm 97, and then the selected animal is coaxed or prodded onto this partition which, in effect, now forms a part of the bottom of the housing 11. After the selected animal has moved into the fourth compartment, the partition 95 is then closed by swinging it around its pivot shaft 96, and it is locked in this position by again moving the hook 97a of the manipulating arm 97 into securing engagement with the top 21 of the housing 11.

When it is desired to dispose of the trapped animals or to transport them to another location, the door 78 is closed, and then the tie links 70 and 70a are released, thus detaching the housing 11 from the housing 10. Now the housing 11, with the entrapped animals, may be transported to any desired location, and the housing 10 may remain and continue to function to trap additional animals. The animals which are entrapped in the third compartment in the housing 11 may, after reaching the desired destination, be destroyed while in the trap, or they may be removed before or after destruction by removing the locking screw 100, thus permitting the transparent panel 98 to be removed to open the end of the housing. The animals which have been entrapped in the fourth compartment may be retained for further observation, or they may be destroyed within the compartment. These animals may be removed from the fourth compartment by swinging the partition 95 downwardly and then removing the animals through the open end of the housing 11. Inasmuch as the housing 11 may be conveniently separated from the housing 10, this permits the animals which are entrapped within the housing 11 to be readily drowned by immersing them in a shallow receptacle, and, furthermore, since the selected animals may be isolated in the fourth compartment, these animals may be drowned or otherwise destroyed in this compartment without the destruction of the animals in the third compartment.

Having thus described my invention, what I claim as new and useful is:

1. An animal trap including a first compartment and a second compartment separated by a partition, the first compartment having an entrance opening, the partition having an opening formed therein to permit communication between the first and second compartments, a first closure movable to open and close the entrance opening, a second closure movable to open and close the partition opening, a gravity-actuated platform located in the first compartment and operable when in normal position to support the first closure in open position and actuatable by the weight of the animal which enters the first compartment through the entrance opening to release the first closure for movement to close the entrance opening, a second gravity-actuated platform located in the second compartment and operably connected with the first and second closures, said second platform being operable independently of said first platform and actuatable by the weight of the animal to open the first closure and close the second closure thereby setting the trap for the entrance of other animals into the first compartment and trapping the animal in the second compartment, and a third compartment in communication-permitting relation with the second compartment, and a third closure operable for selectively separating or permitting communication between the second compartment and the third compartment.

2. An animal trap including a first compartment and a second compartment separated by a partition, the first compartment having an entrance opening, the partition having an opening formed therein to permit communication between the first and second compartments, a first closure movable to open and close the entrance opening, a second closure movable to open and close the opening in said partition, a gravity-actuated platform located in the first compartment and operable when in normal position to support the first closure in open position and actuatable by the weight of an animal which enters the first compartment through the entrance opening to release the first closure for movement to close the entrance opening, a second gravity-actuated platform located in the second compartment, said second platform being in operable relation with the first and second closures, said two platforms being operable independently of each other, and said second platform being actuatable by the weight of the animal to open the first closure and close the second closure, thereby setting the trap for the entrance of other animals into the first compartment and trapping the animal in the second compartment.

3. An animal trap according to claim 2, wherein a baitbox is located in said first compartment, and wherein a wall of said second compartment has a transparent panel aligned with the opening in said partition, whereby an animal trapped in said first baitbox-equipped compartment is induced to leave the same and to enter said second compartment.

4. An animal trap including a first compartment and a second compartment separated by a partition, the first compartment having an entrance opening, the partition having an opening formed therein to permit communication between the first and second compartments, a baitbox in the first compartment, a first closure movable to open and close the entrance opening, a second closure movable to selectively open and obstruct the opening in said partition wall, a gravity-actuated platform located in the first compartment and operable when in normal position to support the first closure in open position and actuatable by the weight of an animal which enters the first compartment through the entrance opening to release the first closure for movement to close the entrance opening, a second gravity-actuated platform located in the second compartment and in operable relation with the first and second closures, said second platform being operable independently of said first platform and actuatable by the weight of the animal to open the first closure and close the second closure, thereby setting the trap for the entrance of other animals into the first compartment and separating the animal in the second compartment from the baitbox.

5. An animal trap including a first compartment and a second compartment separated by a partition, the first compartment having an entrance opening, the partition having an opening formed therein to permit communication between the first and second compartments, a first closure movable to open and close the entrance opening, a second closure movable to open and close the partition opening, a gravity-actuated platform located in the first compartment and operable when in normal position to support the first closure in open position and actuatable by the weight of the animal which enters the first compartment through the entrance opening to release the first closure for movement to close the entrance opening, a second gravity-actuated platform located in the second compartment and operably connected with the first and second closures, said second platform being operable independently of said first platform and actuatable by the weight of the animal to open the first closure and close the second closure thereby setting the trap for the entrance of other animals into the first compartment and trapping the animal in the second compartment, a third compartment in communication-permitting relation with the second compartment, and a third closure manually operable for selectively separating or permitting communication between the second compartment and the third compartments, and a fourth compartment in communcation-permitting relation with the third compartment and a manually-controlled closure operable for selectively separating or permitting communication between the third and fourth compartments whereby an animal may be isolated in the fourth compartment for observation or destruction.

6. An animal trap including a first compartment and a second compartment separated by a partition, the first compartment having an entrance opening, the partition having an opening formed therein to permit communication between the first and second compartments, a closure movable to open and close the entrance opening, a one-way gate in said partition opening to permit passage of an animal from said first compartment to said second compartment while obstructing passage of an animal from said second compartment to said first compartment, a gravity-actuated platform located in the first compartment and operable when in normal position to support the first closure in open position and actuatable by the weight of an animal which enters the first compartment through the entrance opening to release the first closure for movement to close the entrance opening, a second gravity-actuated platform located in the second compartment, said second platform having means operably contacting said closure, said second platform and said last named means being operable independently of said first platform and actuatable by the weight of the animal to open the first closure, thereby setting the trap for the entrance of another animal into the first compartment.

7. An animal trap including a housing, a partition located in the housing to divide it into a first compartment and a second compartment, the first compartment having an entrance opening, the partition having an opening formed therein through which the first compartment may be communicated with the second compartment, a first closure movably secured to the housing and operable to open and close the entrance opening, a second closure for closing the opening in said partition, a platform pivotally supported within the first compartment, closure-engaging means carried by the platform, the center of mass of the platform being located at one side thereof whereby the platform normally gravitates to a position in which the closure-engaging means engage the closure to hold it open, the gravity-actuated platform being actuated by the weight of an animal, a lever pivotally supported within the housing, a second platform supported by the lever within the second compartment, a second lever pivotally supported within the housing and having an arm engaging the first lever and an opposed arm engaging the second closure, the second platform being actuatable by the weight of an animal to open the first closure and close the second closure thereby setting the trap for the entrance of other animals into the first compartment.

8. An animal trap including a first compartment and a second compartment separated by a partition, the first compartment having an entrance opening, the partition having an opening formed therein to permit communication between the first and second compartments, a first closure movable to open and close the entrance opening, a second closure movable to selectively open and close the opening in said partition, a gravity-actuated platform located in the first compartment and operable when in normal position to support the first closure in open position and actuatable by the weight of an animal which enters the first compartment through the entrance opening to release the first closure for movement to close the entrance opening, a second gravity-actuated platform located in the second compartment and operably associated with the first and second closures, said first and second platforms being operable independently of each other, and means operably connecting said second platform and said second closure to selectively open and close said second closure, said last-mentioned means comprising an elongated member extending from said second platform and a second elongated member operably connecting said first elongated member and said second closure to close said closure when said second platform is actuated by the weight of the animal, thereby trapping the animal in the second compartment.

GARY R. BRICKER.

REFERENCES CITED

The following references are of record in the file of this patent:

UNITED STATES PATENTS

| Number | Name | Date |
|---|---|---|
| 71,364 | Churchill | Nov. 26, 1867 |
| 214,221 | Williams et al. | Apr. 8, 1879 |
| 801,537 | Massie | Oct. 10, 1905 |
| 997,841 | McAtee | July 11, 1911 |
| 1,098,064 | Tsumura | May 26, 1914 |
| 1,722,321 | Atwell et al. | July 30, 1929 |
| 1,810,163 | Englund | June 16, 1931 |
| 1,978,995 | Fuller | Oct. 30, 1934 |

FOREIGN PATENTS

| Number | Country | Date |
|---|---|---|
| 45,706 | Austria | Jan. 10, 1911 |

Certificate of Correction

Patent No. 2,446,168. August 3, 1948.

GARY R. BRICKER

It is hereby certified that errors appear in the printed specification of the above numbered patent requiring correction as follows: Column 4, line 34, after the word "gate" insert *40*; column 5, line 10, for "Figs. 7 and 9" read *Figs. 7 to 9*; column 6, line 47, for "that it" read *that its*; and that the said Letters Patent should be read with these corrections therein that the same may conform to the record of the case in the Patent Office.

Signed and sealed this 26th day of October, A. D. 1948.

[SEAL]

THOMAS F. MURPHY,
*Assistant Commissioner of Patents.*